O. LINDEMANN.

Metallic Mats for Bird-Cages.

No. 6,231. Reissued Jan. 12, 1875.

Witnesses.

Henry Gentner

Chas. Wahlers.

Inventor.

Otto Lindemann per

Van Santvoord & Hauff attys.

THE GRAPHIC CO. PHOTO-LITH. 39 & 41 PARK PLACE, N.Y.

UNITED STATES PATENT OFFICE.

OTTO LINDEMANN, OF EDGEWATER, NEW YORK.

IMPROVEMENT IN METALLIC MATS FOR BIRD-CAGES.

Specification forming part of Letters Patent No. 122,472, dated January 2, 1872; reissue No. 6,231, dated January 12, 1875; application filed October 7, 1874.

*To all whom it may concern:*

Be it known that I, OTTO LINDEMANN, of Edgewater, in the county of Richmond and State of New York, have invented a certain new and useful Improvement in Mats for Bird-Cages, of which the following is a specification:

This invention is illustrated in the accompanying drawing, in which—

Figure 1:
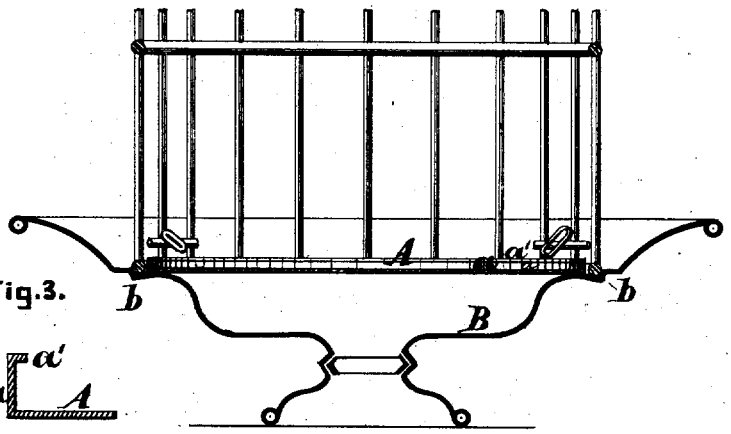
Figure 3:
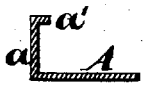
Figure 2:
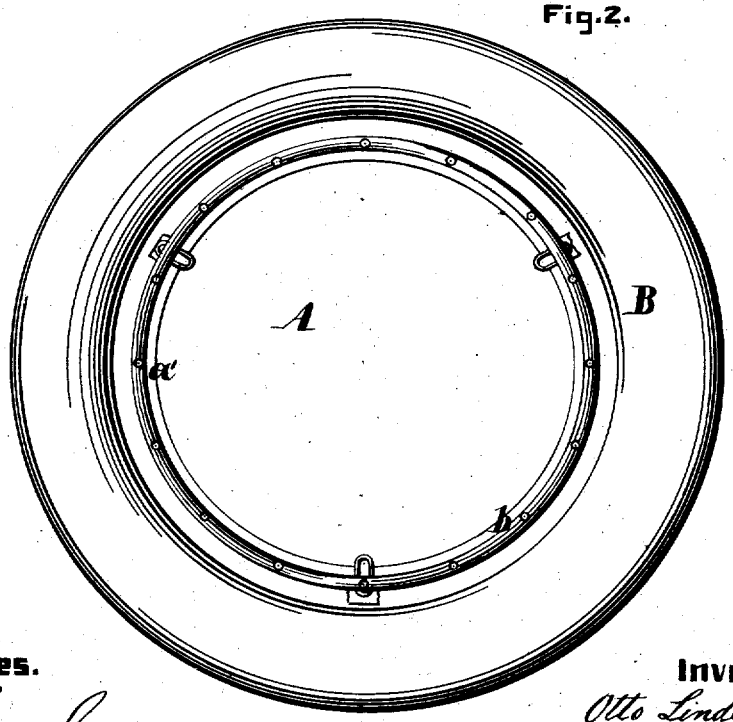

Figure 1 represents a vertical section. Fig. 2 is a plan or top view. Fig. 3 is a central section.

Similar letters indicate corresponding parts.

This invention consists in combining with the circular dome of a bird-cage, and with its detachable circular bottom, a circular metallic mat, in such manner that, when the dome is removed, the mat, together with all the impurities collected thereon, can be removed, and thereby the stand of the cage is preserved. Said mat is stamped up or spun with a raised rim and an inwardly-projecting flange, so as to render it capable of retaining sand, which is requisite for the health of the bird.

In the drawing, the letter A designates my mat, which is struck up or spun of sheet metal in the proper form to fit the bottom of a bird-cage, as shown.

A mat of this description is cheap and durable. It can be conveniently removed from the cage for the purpose of cleaning, and at the same time it does not interfere with the appearance of the cage.

My mat is provided with a raised rim, *a*, and an inwardly-projecting flange, *a'*, so that the same is rendered capable of containing a quantity of sand, which is requisite for the health of the bird; and, furthermore, this flange prevents the water which the bird spills from the bathing or drinking cup from running down on the bottom or stand B.

My mat is particularly intended for bird-cages with raised stands, as shown in Fig. 1, said stands being provided with a recess, *b*, for the reception of the bottom ring of the cage, and also for the reception of the mat, said mat being of such a size that it fits nicely in the interior of the cage.

When it is desired to remove the mat for cleaning, the cage is detached from the stand B and lifted off, and after the mat has been cleaned and refilled with fresh sand it can be replaced within the cage with little trouble.

By this metallic mat the bottom of the cage is effectually protected against dirt, water, or other impurities, and the mat is durable and cheap. It can be readily kept clean. It is not injurious to the health of the bird. It does not interfere with the appearance of the cage. By combining with the circular dome of a bird-cage and its removable circular bottom a circular metallic mat, the same is prevented from slipping, and can only be removed from the cage for the purpose of cleaning when the dome is detached and removed from the stand. It can be readily removed and replaced, and, on account of its capability of containing sand, it proves beneficial to the bird.

What I claim as new, and desire to secure by Letters Patent, is—

1. The combination, with the circular dome of a bird-cage and its detachable circular stand, of a circular metallic mat, said mat serving to collect impurities, and to cover the central depression in the stand created by its pedestal, substantially as described.

2. As a new article of manufacture, a cage-mat constructed of sheet metal, with a raised rim and a laterally-projecting flange, substantially as described, for the purpose specified.

In testimony that I claim the foregoing I have hereunto set my hand and seal this 29th day of September, 1874.

OTTO LINDEMANN. [L. S.]

Witnesses:
W. HAUFF,
E. F. KASTENHUBER.